United States Patent [19]

Kazunori

[11] Patent Number: 4,624,503
[45] Date of Patent: Nov. 25, 1986

[54] FRAME FOR A VEHICLE SEAT
[75] Inventor: Hashimoto Kazunori, Akishima, Japan
[73] Assignee: Tachikawa Spring Co. Ltd., Japan
[21] Appl. No.: 695,902
[22] Filed: Jan. 29, 1985
[51] Int. Cl.⁴ .............................................. A47C 7/02
[52] U.S. Cl. .................................... 297/452; 297/458
[58] Field of Search ......... 297/452, 454, 458, DIG. 2; 296/65

[56] References Cited

U.S. PATENT DOCUMENTS

| | | | |
|---|---|---|---|
| 3,411,824 | 11/1968 | White et al. | 297/452 |
| 3,639,002 | 2/1972 | Tischler | 297/452 |
| 3,727,980 | 4/1973 | Tischler | 297/452 |
| 3,762,770 | 10/1973 | Tedesco et al. | 297/458 X |
| 3,797,886 | 3/1974 | Griffiths | 297/452 |
| 3,924,892 | 12/1975 | Geier | 297/452 X |
| 4,337,931 | 7/1982 | Mundell et al. | 297/452 X |

Primary Examiner—Peter A. Aschenbrenner
Attorney, Agent, or Firm—Darby & Darby

[57] ABSTRACT

A frame for use in a seat for a vehicle such as an automobile is disclosed which can be placed directly on a floor of a vehicle and also can be removed from the vehicle floor by hooking a fingertip on it. In this frame, the inner edge of the frame on which the fingertip is to be caught is foldedly formed into a right-angle shape so as to prevent the fingertip against damage, and the frame is inclined higher in its inward direction to prevent springs from coming into contact with the frame even when they are flexed due to application of loads.

3 Claims, 4 Drawing Figures

U.S. Patent  Nov. 25, 1986  Sheet 2 of 2  4,624,503 ated to a vehicle floor, which is so adapted that, after it is assembled, an occupant can remove the seat from the vehicle floor by lifting it up with his finger.

FRAME FOR A VEHICLE SEAT

BACKGROUND OF THE INVENTION

1. Field of the Invention

The present invention relates to a frame for use in a vehicle seat and, more particularly, to a frame located in the front portion of a vehicle seat such as a rear seat cushion which can be directly placed on and assembled to a vehicle floor and, which is so adapted that, after it is assembled, an occupant can remove the seat from the vehicle floor by lifting it up with his finger.

2. Description of the Prior Art

A conventional frame of this type, as shown in FIG. 1(A), comprises a substantially L-shaped one which includes a main body (a') formed of a band-like metal plate and an upwardly bent portion (a1') extended integrally from the main body (a') at the front end portion thereof. Therefore, when a seat cushion using such conventional frame is removed from a vehicle floor to which it has been assembled, it is necessary for an occupant to insert his finger tip between the vehicle floor and the bottom of the frame and put his fingertip against the inner end (a2') of the main body (a') in order to lift up the seat cushion, as shown by two-dot chained lines. However, since the inner end (a2') of the main body (a') is formed with sharp edges or pointed corners, there is a possibility that the occupants fingertip will be injured. According to another prior art frame, an upwardly curved portion (a3') is provided in the inner end of the main body against which the fingertip is abutted, as shown in FIG. 1(B). This is very effective in eliminating the above-mentioned drawback. However, when loads are applied to the seat or the seat cushion (that is, when an occupant is seated on the seat cushion) and thus a spring (b) is flexed, the flexed spring (b) is abutted against the upwardly curved portion (a3'), which provides a strange sound. Also, there is a possibility that the spring (b) may be damaged at its portion that contacts the end of the upwardly curved portion (A3') when the seat it is used for long periods of time.

In FIGS. 1(A) and 1(B), reference character (c) stands for a top member, (d) designates a hog ring for fixing the end of the top member (c) to the frame (a') or (a''), and (b1) represents a clamp welded to the frame main body (a') or (a'') to catch the end of the spring (b) on the main body (a') or (a''). The above-mentioned spring (b) is formed by folding an S spring into a substantially V-shaped side elevation configuration.

SUMMARY OF THE INVENTION

The present invention aims at eliminating the drawbacks found in the above-described prior art frames.

Accordingly, it is a primary object of the invention to provide a safer frame which permits an occupant to lift it up with his fingertip to remove a seat cushion without injuring his fingertip.

It is another object of the invention to provide a new frame having an end which will not be engaged with a part of a spring mounted to the frame even when loads are applied to the spring.

In order to accomplish the foregoing objects, according to the invention, the inner end of the frame, into which the occupant puts his finger for lifting up the seat cushion, is upwardly bent at a right angle relative to the main body of the frame so as to avoid injury to the occupant's fingertip due to the sharp edges of the inner end of the frame, and also the frame has an inclined portion sloped higher in a direction inwardly of the frame, with such a high angle that the spring will never be engaged with the inner end of the frame even when it is flexed due to the application of the loads.

The above and other related objects and features of the invention will be more apparent from a reading of the following detailed description of the disclosure found in the accompanying drawings and the novelty thereof pointed out in the appended claims.

DETAILED DESCRIPTION OF A PREFERRED EMBODIMENT OF THE INVENTION

Figure 2:
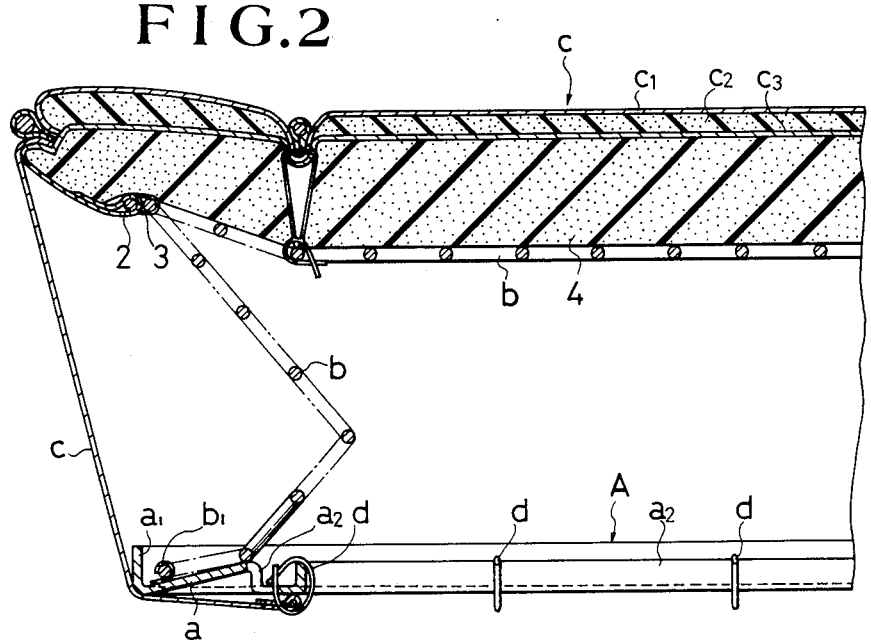
FIG. 2 is a longitudinally sectional view of a frame constructed in accordance with the invention, illustrating a state in which the frame is being used in a vehicle seat or a seat cushion; and, FIG. 3 is a partially enlarged view of the frame of the invention.

FIG. 2 illustrates a frame (A) of the invention while it is actually used in a vehicle or automotive seat. This frame (A) comprises a main body (a) which is formed of a band-like metal plate, includes a spring (b) fixedly mounted at its end thereto, and has an inclined portion that is sloped higher in a direction inwardly thereof; an upwardly bent portion (a1) extending vertically at the outer end portion of the main body (a); and, a reinforcing portion (a2) extended from the inner end of the main body (a). The reinforcing portion (a2) is formed with a substantially U-shaped configuration in section, is connected directly to the main body (a) in such a manner that its opening is faced upwardly, and is formed in its longitudinal direction with through bores (1), (1), spaced apart from one another at predetermined intervals for insertion of hog rings thereto spaced at predetermined intervals. The above-mentioned spaced at predetermined intervals. The above-mentioned main body (a), upwardly bent portion (a1) and reinforcing portion (a2) are formed by a press simultaneously.

The angle of inclination of the main body (a) is preselected such that the spring (b) will not be abutted against the reinforcing portion (a2) even when the spring (b) is flexed due to application of loads.

A large number of springs (b), with their respective ends caught on the clamp (b1), are secured in their respective peripheral edges to an upper frame wire (2) by means of clips (3), and a cushion member (4) formed of foam material or the like is placed over such large number of springs (b). The portion of a top member (c) which forms the upper surface of the vehicle seat includes a top layer (c1), a wadding (c2) and a wadding cover (c3), while the portion of the top member (c) forming the side surface of the vehicle seat comprises one layer. Also, the end of the top member (c) is fixedly secured to the reinforcing piece portion (a2) of the above-mentioned frame (A) by means of hog rings (d).

Figure 3:
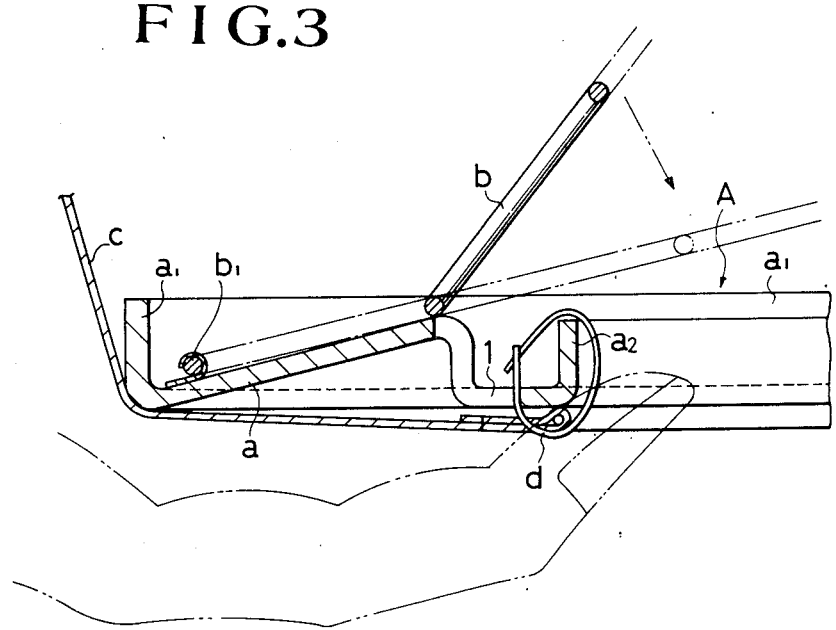

FIG. 3 illustrates how to remove a seat cushion after it is assembled to a vehicle floor. The seat cushion can be removed when an occupant hooks his fingertip onto the upwardly curved portion of the reinforcing portion (a2) of the frame (A) and then lifting it up, as shown by two-dot chained lines. After the seat cushion is assembled to the vehicle floor, when the spring is flexed due to application of loads, then the spring (b) is moved as shown by another two-dot chained lines, but the spring (b) will never be abutted against the reinforcing portion (a2).

The seat cushion is mounted to the vehicle floor in such a manner that it can be removed from the vehicle floor when it is lifted upwardly.

Figure 1A:
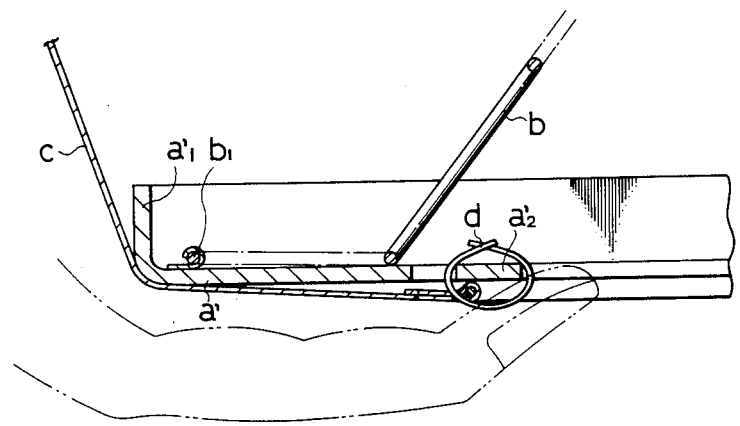
FIGS. 1(A) and (B) are respectively longitudinally sectional view of conventional frames, illustrating some portions thereof.
Figure 1B:
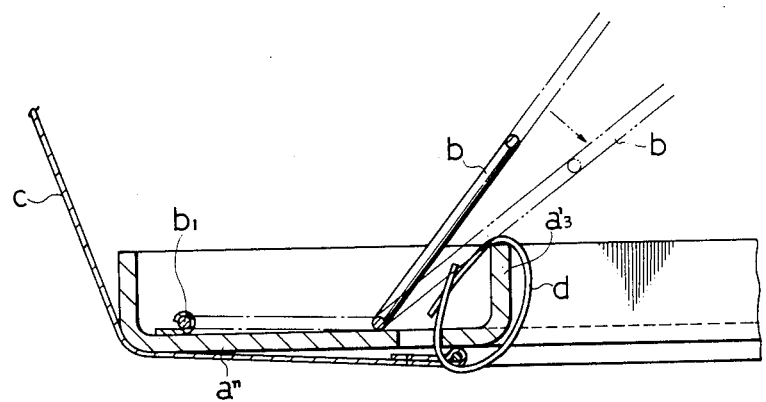

The above-mentioned frame (A) is formed in a framework shape. The front portion of the frame (A) has such a sectional form as shown in the above-mentioned embodiment of the invention, while the rear portion as well as the right and left side portions thereof have such sectional forms as shown in FIG. 1(A). The front portion of the frame (A) is welded to the right and left side portions.

As described hereinbefore, according to the invention, since there are provided an upwardly bent portion and a reinforcing portion respectively extending at the inner and outer ends of a band-plate-like main body of a frame to strengthen the rigidity of the main body, there is no possibility that the frame will be deformed after a seat is assembled to a vehicle floor or when the seat is removed from the vehicle floor after it is assembled. Also, since the reinforcing portion, which an occupant touches with his fingertip to remove the seat from the vehicle floor, is so formed as to have an upwardly curved configuration, the occupant's fingertip will not be injured. Further, since the main body of the frame is formed with an inclined portion that is sloped higher in a direction inwardly of the main body, even when a spring is flexed due to application of loads, the spring will never be brought into contact with the frame so that a strange sound will never be produced between them. In addition, since the upwardly bent portion and the reinforcing portion are in contact with the vehicle floor while the main body of the frame at its inclined portion is not in contact with the vehicle floor, the frame can be assembled to the vehicle floor with no rattling noise.

What is claimed is:

1. A frame for use in the bottom of a vehicle seat, comprising:

a main body formed of a band-like metal plate, said main body having an upper surface facing inwardly from the bottom of said vehicle seat, an outer edge of the plate extending along the longitudinal direction as well as outwardly thereof and an inner edge of the plate extending along the longitudinal direction of the plate;

an upwardly bent portion extending upwardly from said outer edge of said main body in a direction vertical to said main body;

a reinforcing portion having a substantially U-shaped configuration in section, said reinforcing portion being formed with one leg of the U-shaped portion comprising the inner edge of said main body;

an inclined portion defined between said upwardly bent portion and the other leg of the U-shaped said reinforcing portion, said inclined portion being so sloped that it becomes higher from a lower portion of said upwardly bent portion up to an upper end of said reinforcing portion in such a manner that the inclined portion as a whole extends higher in a direction inwardly of said main body; and a plurality of cushioning springs fixedly secured at their respective ends to said upper surface of said main body.

2. The frame for use in a vehicle seat according to claim 1, wherein said reinforcing portion is formed with a plurality of through bores spaced apart from one another at predetermined intervals and said plurality of through bores are adapted for insertion of hog rings therethrough.

3. The frame for use in a vehicle seat according to claim 1, wherein said cushioning springs are formed such that they are bent as a whole so as to provide an overall V-shaped configuration when viewed from the side of the vehicle seat.

* * * * *